US011924935B2

(12) United States Patent
Karray et al.

(10) Patent No.: US 11,924,935 B2
(45) Date of Patent: Mar. 5, 2024

(54) METHOD FOR OPERATING AN AUTOMOTIVE ARRANGEMENT AND AUTOMOTIVE ARRANGEMENT

(71) Applicant: VALEO VISION, Bobigny (FR)

(72) Inventors: Marouene Karray, Bobigny (FR); Rabih Taleb, Bobigny (FR); Hafid El Idrissi, Bobigny (FR)

(73) Assignee: Valeo Vision, Bobigny (FR)

( * ) Notice: Subject to any disclaimer, the term of this patent is extended or adjusted under 35 U.S.C. 154(b) by 15 days.

(21) Appl. No.: 17/609,538

(22) PCT Filed: May 11, 2020

(86) PCT No.: PCT/EP2020/063035
§ 371 (c)(1),
(2) Date: Nov. 8, 2021

(87) PCT Pub. No.: WO2020/239420
PCT Pub. Date: Dec. 3, 2020

(65) Prior Publication Data

US 2022/0232677 A1 Jul. 21, 2022

(30) Foreign Application Priority Data

May 29, 2019 (FR) ...................................... 1905792

(51) Int. Cl.
*H05B 45/18* (2020.01)
*H05B 47/105* (2020.01)

(52) U.S. Cl.
CPC ........... *H05B 45/18* (2020.01); *H05B 47/105* (2020.01)

(58) Field of Classification Search
CPC ..... H05B 45/18; H05B 47/105; H05B 47/115
See application file for complete search history.

(56) References Cited

U.S. PATENT DOCUMENTS 6,759,761 B1 * 7/2004 Schmitt .................. H05B 45/12 307/112
8,264,401 B1 9/2012 Kavaler
(Continued)

FOREIGN PATENT DOCUMENTS

CN 103930794 A 7/2014
CN 106218329 A 12/2016
(Continued)

OTHER PUBLICATIONS

European Patent Office, International Search Report and Written Opinion of corresponding International Application No. PCT/EP2020/063035, dated Jul. 1, 2020.
(Continued)

*Primary Examiner* — Daniel D Chang
(74) *Attorney, Agent, or Firm* — Valeo Vision

(57) ABSTRACT

This invention provides a method for operating an automotive arrangement with a lighting device and a vehicle sensor. This method comprises the steps of providing a plurality of auxiliary sensors, configured to provide some device data, provide a control unit configured to estimate a vehicle sensor temperature using the device data and controlling an operation parameter of the automotive lighting device using the estimated vehicle sensor tem-perature. The invention also provides a data processing element and a computer program to carry out this method and an automotive lighting device comprising a control unit which carries out this method.

10 Claims, 1 Drawing Sheet

(56) References Cited

U.S. PATENT DOCUMENTS

| | | | | |
|---|---|---|---|---|
| 10,371,258 | B2 | 8/2019 | Kawamura et al. | |
| 2004/0179367 | A1 | 9/2004 | Takeda et al. | |
| 2005/0082553 | A1 * | 4/2005 | Yamamoto | H05B 45/56<br>257/83 |
| 2006/0274540 | A1 * | 12/2006 | Klaver | B60Q 3/80<br>362/479 |
| 2007/0014329 | A1 * | 1/2007 | Sinha | G01K 7/16<br>374/185 |
| 2008/0203273 | A1 * | 8/2008 | Deurenberg | H05B 45/22<br>315/149 |
| 2010/0191418 | A1 * | 7/2010 | Mimeault | H05B 47/125<br>356/4.01 |
| 2012/0242242 | A1 * | 9/2012 | Linz | H05B 45/28<br>315/210 |
| 2017/0240107 | A1 * | 8/2017 | Fleurence | B60Q 3/80 |

FOREIGN PATENT DOCUMENTS

| | | | |
|---|---|---|---|
| CN | 107517597 | A | 12/2017 |
| CN | 108202663 | A | 6/2018 |
| DE | 10000913 | A1 | 7/2001 |
| DE | 10137818 | C1 | 4/2003 |
| GB | 2548452 | A | 9/2017 |
| JP | 2009173123 | A | 8/2009 |
| JP | 2013082267 | A | 5/2013 |
| WO | 2014049216 | A1 | 4/2014 |

OTHER PUBLICATIONS

Japanese Patent Office, Office Action of corresponding Japanese Application No. 2021-570373, dated Feb. 24, 2023.

* cited by examiner

[Fig. 1]
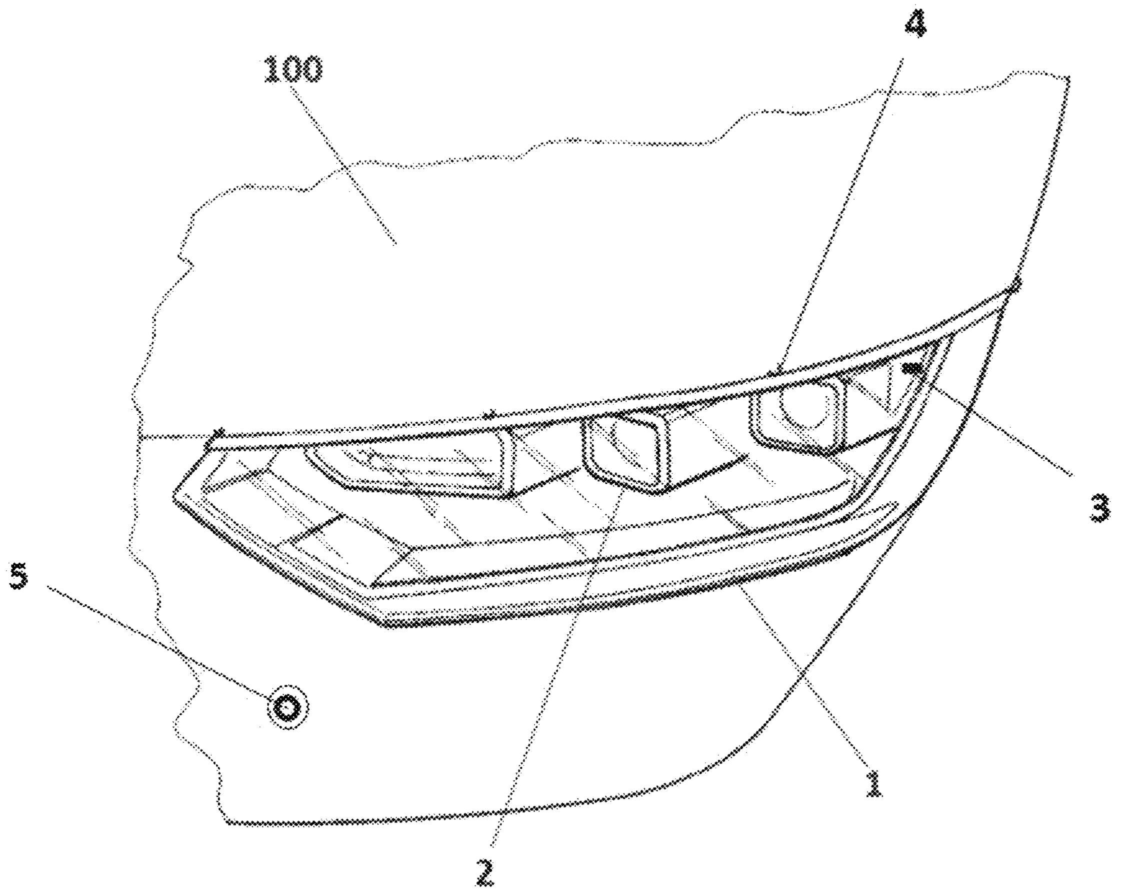
[Fig. 2]
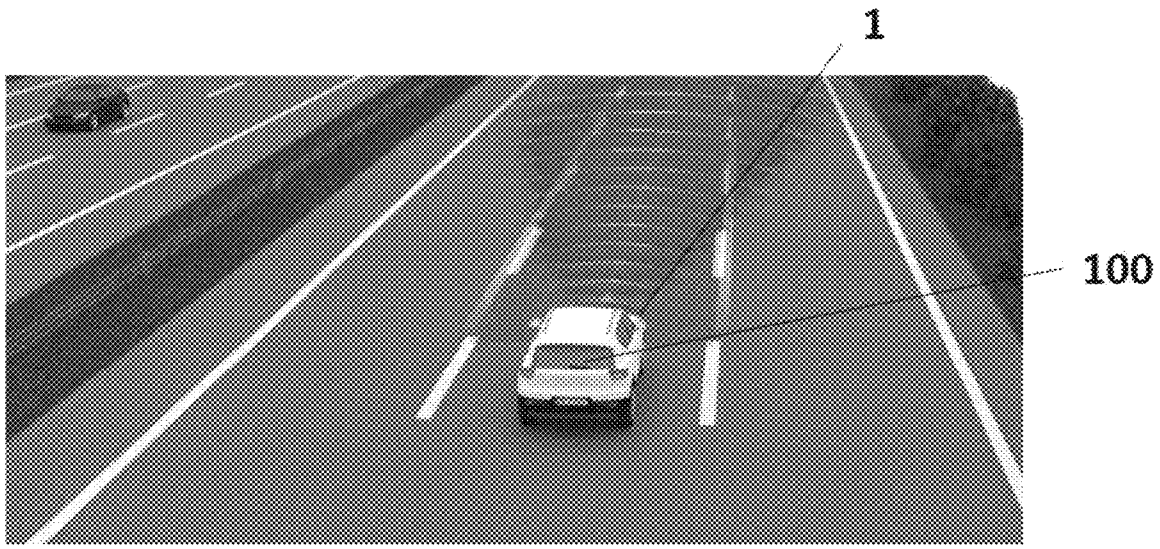

METHOD FOR OPERATING AN AUTOMOTIVE ARRANGEMENT AND AUTOMOTIVE ARRANGEMENT

CROSS-REFERENCE TO RELATED APPLICATIONS

This is a 371 application (submitted under 35 U.S.C. § 371) of International Application No. PCT/EP2020/063035 (WO2020239420) filed on May 11, 2020, which claims priority date benefit to French Application No. 1905792 filed May 29, 2019, the disclosures of which are incorporated herein by reference in their entirety.

TECHNICAL FIELD

This invention is related to the field of automotive lighting devices, and more particularly, to the temperature management of these devices.

BACKGROUND

Digital lighting devices are being increasingly adopted by car makers for middle and high market products.

These digital lighting devices usually comprise solid-state light sources, the operation of which heavily depends on temperature.

Temperature control in these elements is a very sensitive aspect, and further affects to other elements of the automotive vehicle arrangement, such as radar sensors. These sensors are affected by the high temperatures of the lighting devices, and must turn off in the event the temperature reaches a threshold. This causes that the performance of these sensors may be heavily affected and the operation of these sensors may not be guaranteed in all situations, which affects the vehicle user's experience and the image of the car manufacturer.

SUMMARY

This problem has been assumed until now, but a solution therefor is sought.

The invention provides an alternative solution for managing the temperature of the light sources of an automotive lighting device by a method for operating an automotive arrangement according to claim 1, a data processing element according to claim 9, a computer program according to claim 10 and an automotive arrangement according to claim 11. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for operating an automotive arrangement, the automotive arrangement comprising an automotive lighting device and a vehicle sensor, and the automotive lighting device comprising at least one solid-state light source, the method comprising the steps of:

- providing a plurality of auxiliary sensors, configured to provide some device data;
- provide a control unit configured to estimate a vehicle sensor temperature using the device data;
- estimating the vehicle sensor temperature using the device data; and
- controlling an operation parameter of the automotive lighting device using the estimated vehicle sensor temperature.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, po-tentially increasing the lifespan of the illumination device. Some examples of these types of lighting comprise semiconductor light-emitting diodes (LEDs), organic light-emitting diodes (OLEO), or polymer light-emitting diodes (PLED) as sources of illumination rather than electrical filaments, plasma or gas.

With this method, a wide range of data related to the whole operation of the lighting device is used to control the temperature in the vehicle sensor, so that this temperature may be kept under control by a smart management of the monitored conditions.

In some particular embodiments, the control unit is configured to estimate the vehicle sensor temperature by means of:

- training the control unit to estimate the vehicle sensor temperature with a training dataset; and
- testing the control unit with real vehicle sensor temperature data.

This way of training the control unit is useful since provides the control unit with the ability to estimate the vehicle sensor temperature without using a direct sensor, based on indirect data. Hence, this control unit, when installed in an automotive lighting device, is capable of estimating the external device temperature without a dedicated sensor.

In some particular embodiments, the control unit is configured to estimate the vehicle sensor temperature by means of:

- training the control unit to estimate the vehicle sensor temperature with a training dataset;
- simulate a first time for vehicle sensor deactivation if no action is carried out;
- associate an action over an operation parameter to the values of the estimated vehicle sensor temperature;
- simulate the action over the operation parameter;
- simulate a second time for vehicle sensor deactivation after the action has been carried out; and
- testing the control unit with the simulated action to verify whether the second time for vehicle sensor deactivation is greater than the first time for vehicle sensor deactivation.

In this case, the time for deactivation is used as a parameter to be maximized in the vehicle operation, so that the control unit may act on different operation parameters so as to try to increase this time for deactivation as long as possible.

In some particular embodiments, the step of training the control unit comprises the use of a machine learning algorithm.

This machine learning algorithm uses the sensor data as training data to estimate a vehicle sensor temperature. The values of vehicle sensor temperatures are tested with a vehicle sensor temperature sensor which is used during the training process. Once the results are validated, the vehicle sensor temperature sensor may be removed and the control unit may estimate this temperature.

In some particular embodiments, the operation parameter comprises at least one of a current value of the light source or a current value of the vehicle sensor, operation and/or power level of a fan, opening or closing of ventilation gates or operation of active cooling elements.

Due to the estimated vehicle sensor temperature, the control unit may perform a thermally oriented control in the lighting device, acting over one or more of the afore-mentioned features, so as to improve the thermal behavior of the vehicle sensor.

In some particular embodiments, the plurality of auxiliary sensors comprise at least one of a vehicle speed sensor, an ambient temperature sensor, an ambient humidity sensor, an external light sensor, an air speed sensor, a lighting functionality activation sensor, a light source temperature, a geo-positioning sensor or a camera to assess the presence of other vehicles.

These are examples of data which may be used to train and then estimate the optimal control action.

In some particular embodiments, the device data further comprises physical data of the automotive lighting device, such as the volume of the lighting device or a distance between two points of the lighting device.

The invention not only uses data obtained by sensors, but may also take into account physical properties of the lighting device itself.

In a further inventive aspect, the invention provides a data processing element comprising means for carrying out the steps of a method according to the first inventive aspect and a computer program comprising instructions which, when the program is executed by a control unit, cause the control unit to carry out the steps of a method according to the first inventive aspect.

In a further inventive aspect, the invention provides an automotive lighting device comprising:

- an automotive lighting device comprising in turn a matrix arrangement of solid-state light sources, a plurality of auxiliary sensors configured to provide some device data and a control unit for performing the steps of the method according to the first inventive aspect; and
- a vehicle sensor.

This lighting device provides the advantageous functionality of efficiently managing the thermal performance of the automotive arrangement, by means of a correct choice between actions over the operation parameters, thus ensuring the proper operation of the vehicle sensor.

In some particular embodiments, the matrix arrangement comprises at least 2000 solid-state light sources.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, many light sources may be managed at the same time.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a general perspective view of an automotive lighting device and a sensor comprised in an automotive arrangement according to the invention.

FIG. 2 shows an automotive arrangement according to the invention, mounted in an automotive vehicle.

DETAILED DESCRIPTION

In these figures, the following reference numbers have been used:

1 Headlamp
2 LED
3 Control unit
4 Auxiliary sensors
5 Radar sensor
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This headlamp 1 is installed in an automotive vehicle 100 and comprises

- a matrix arrangement of LEDs 2, intended to provide a light pattern;
- a control unit 3 to perform a thermal control of the operation of the LEDs 2;
- a plurality of auxiliary sensors 4 intended to provide device data; and
- a radar sensor 5.

This matrix configuration is a high-resolution module, having a resolution greater than 2000 pixels. However, no restriction is attached to the technology used for producing the projection modules.

The control unit, previously to its installation in the automotive headlamp, has undergone a training process.

This training process comprises some machine learning steps, where the control unit is trained with training data provided by the plurality of auxiliary sensors and from the physical properties of the lighting device itself. Among these training data values, the auxiliary sensors include a vehicle speed sensor, an ambient temperature sensor, an ambient humidity sensor, an external light sensor, an air speed sensor, a lighting functionality activation sensor, a light source thermistor, a geo-positioning sensor or a camera to assess the presence of other vehicles. Further, the algorithm is also fed with physical data of the lighting device, such as the volume of the headlamp or internal headlamp dimensions.

The control unit receives these data and calculates, provided these conditions, the time remaining for deactivating the radar sensor if no action is carried out. This time takes into account, e.g., the cooling effect of the air impinging in the headlamp, the presence of other vehicles surrounding the headlamp, the ambient temperature obtained by direct means and the ambient temperature of the location where the vehicle is going to travel to. All these data are used to calculate the first time for radar sensor deactivation.

The control unit then uses the data to associate an action over an operation parameter. For example, if the time for radar sensor deactivation is short, less than 10 minutes, and the location in the next 30 minutes is a well lighted runway, the action may be reducing the intensity of the light modules. If the location has not enough light, the action may be increasing the power of the fan, or if no traffic is detected, the radar may be put at a lower frequency. Then, the control unit simulates the thermal behavior of the radar sensor after this action is carried out. A second time for radar sensor deactivation is obtained, due to the changing conditions in all the elements surrounding the radar sensor, especially the lighting device, after the considered action. This second time for radar sensor deactivation will depend on the action which has been carried out, so the control unit learns which actions are the most appropriate in each circumstance. When this training is finished, the control unit is capable of deciding the most suitable action for each set of device data, in order to enlarge as long as possible the time for radar sensor deactivation.

Once this training process is finished, the control unit is installed in an automotive vehicle 100 of FIG. 1, to perform a thermal control of the radar sensor 5.

FIG. 2 shows an automotive vehicle 100 with a headlamp 1, further comprising such a control unit and a plurality of auxiliary sensors. When the headlamp 1 is in operation, the control unit will perform the following actions:

- receive the data from the plurality of auxiliary sensors and from the device data;
- estimating the vehicle sensor temperature using the device data; and
- controlling an operation parameter of the automotive headlamp 1 using the estimated vehicle sensor temperature.

As described above, the control unit receives many data from the exterior of the vehicle 100: vehicle speed, ambient temperature, ambient humidity, external light, air speed, lighting functionality activation, light source temperature, geo-positioning or presence of other vehicles.

Once the control unit receives this information (both from the sensors and from the device data), it uses the data from the learning process to generate an estimated condition of the device data. This estimated condition may be the time for derating. This estimated condition, together with the data received by the control unit and the data learned in the learning process, provides the control unit with the information necessary to choose an action for controlling an operation parameter, so as to optimize the time for derating.

As described above, the control unit may manage a wide range of operation parameters, for example those related to the lighting module operation (the current value of the light source, the current value or the operation frequency of the radar sensor, etc.) or a heat dissipation parameter (operation and power level of a fan, opening or closing of ventilation gates, active cooling elements, etc.).

With this control unit, the lighting device avoids an excessive oversizing and optimize the lifespan of its parts.

What is claimed is:

1. A method for operating an automotive arrangement, the automotive arrangement comprising an automotive lighting device with at least one solid-state light source and a vehicle sensor, the method comprising:

- receiving device data from a plurality of auxiliary sensors;
- estimating, with a control unit, the vehicle sensor's temperature utilizing the device data; and
- controlling an operational parameter of the automotive lighting device responsive to the vehicle sensor's temperature;

wherein the control unit is configured to estimate the vehicle sensor's temperature by training the control unit to estimate the vehicle sensor's temperature with a training dataset; and by testing the control unit with real vehicle sensor temperature data.

2. The method according to claim 1, wherein the control unit is configured to estimate the vehicle sensor's temperature by:

- training the control unit to estimate the vehicle sensor's temperature with the training dataset;
- simulating a first time for vehicle sensor deactivation if no action is carried out;
- associating an action over an operation parameter to the values of values of an estimated vehicle sensor temperature;
- simulating the action over the operation parameter;
- simulating a second time for vehicle sensor deactivation after the action has been carried out; and
- testing the control unit with the simulated action to verify whether the second time for vehicle sensor deactivation is greater than the first time for vehicle sensor deactivation.

3. The method according to claim 2, wherein training the control unit includes utilizing a machine learning algorithm.

4. The method according to claim 1, wherein the operation parameter is at least one of a current value of the light source or a current value of the vehicle sensor.

5. The method according to claim 1, wherein the operation parameter comprises at least one of power level of a fan, changing position of ventilation gates, or operation of active cooling elements.

6. The method according to claim 1, wherein the plurality of auxiliary sensors comprise at least one of a vehicle speed sensor, an ambient temperature sensor, an ambient humidity sensor, an external light sensor, an air speed sensor, a lighting functionality activation sensor, a light source temperature, a geo-positioning sensor or a camera to assess the presence of other vehicles.

7. The method according to claim 1, wherein the device data further comprises physical data of the automotive lighting device.

8. A non-transitory computer readable medium comprising instructions which, when the instructions are executed by a control unit, cause the control unit to carry out a method, the method comprising:

- receiving device data from a plurality of auxiliary sensors;
- estimating, with a control unit, a vehicle sensor's temperature utilizing the device data; and
  - controlling an operational parameter of an automotive lighting device responsive to the vehicle sensor's temperature;

wherein the control unit is configured to estimate the vehicle sensor's temperature by training the control unit to estimate the vehicle sensor's temperature with a training dataset; and by testing the control unit with real vehicle sensor temperature data.

9. An automotive arrangement comprising:

- an automotive lighting device comprising a matrix arrangement of solid-state light sources, a plurality of auxiliary sensors configured to provide some device data and a control unit for performing a method, the method comprising:

receiving device data from the plurality of auxiliary sensors;

estimating, with the control unit, a vehicle sensor's temperature utilizing the device data; and controlling an operational parameter of the automotive lighting device responsive to the vehicle sensor's temperature; and a vehicle sensor;

wherein the control unit includes utilizing a machine learning algorithm;

wherein the control unit is configured to estimate the vehicle sensor's temperature by training the control unit to estimate the vehicle sensor's temperature with a training dataset; and by testing the control unit with real vehicle sensor temperature data.

10. The automatic arrangement according to claim 9, wherein the matrix arrangement comprises at least 2000 solid-state light sources.

* * * * *